Dec. 26, 1967  H. W. BAINTON  3,359,597
EXTRUDER-ROLLER DIE
Filed July 26, 1966  3 Sheets-Sheet 1
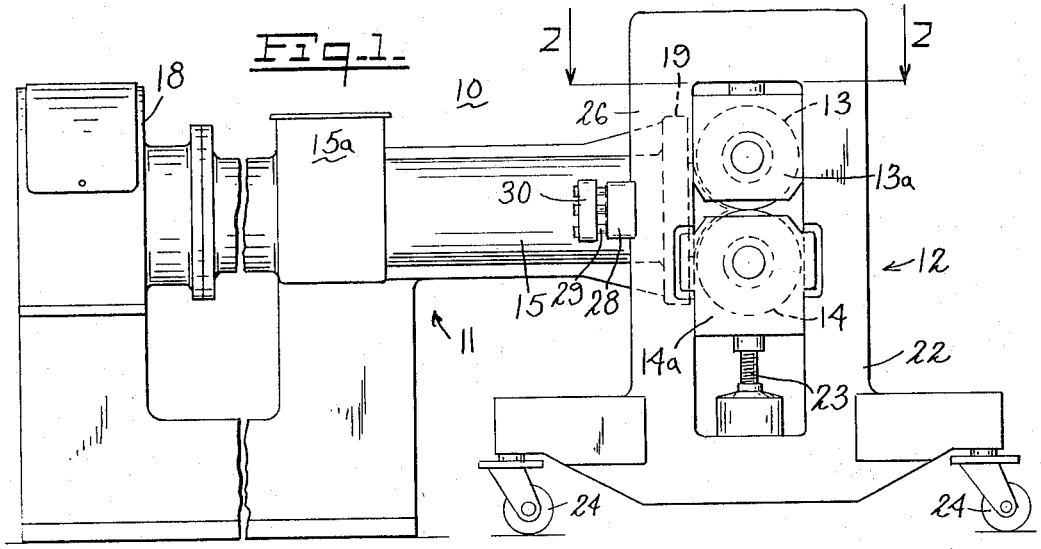
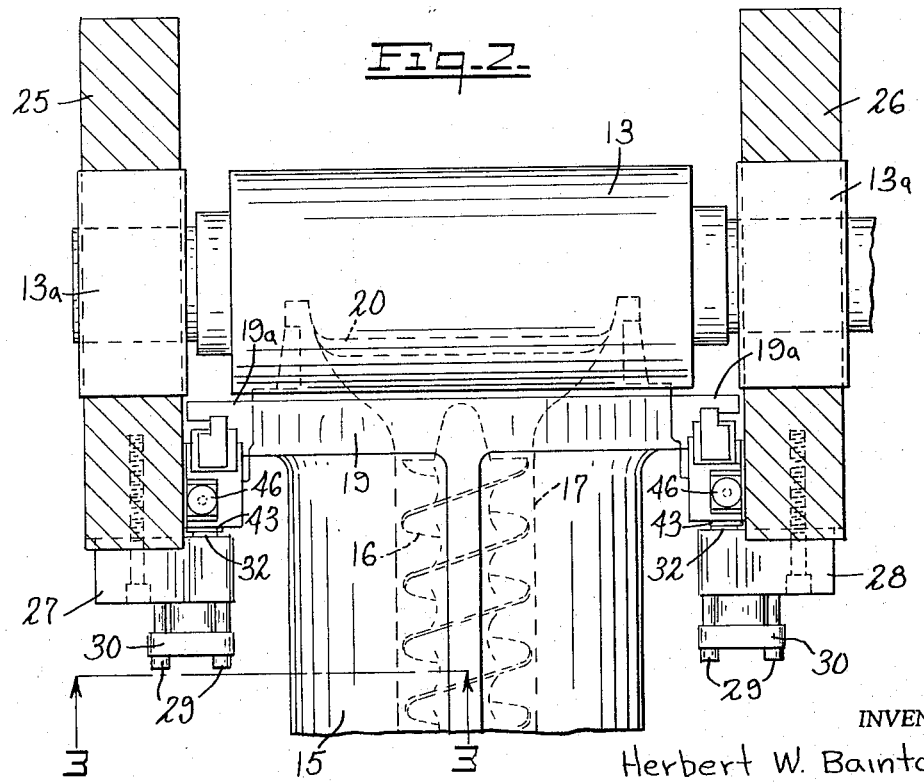
INVENTOR
Herbert W. Bainton
BY DeLio and Montgomery
ATTORNEYS

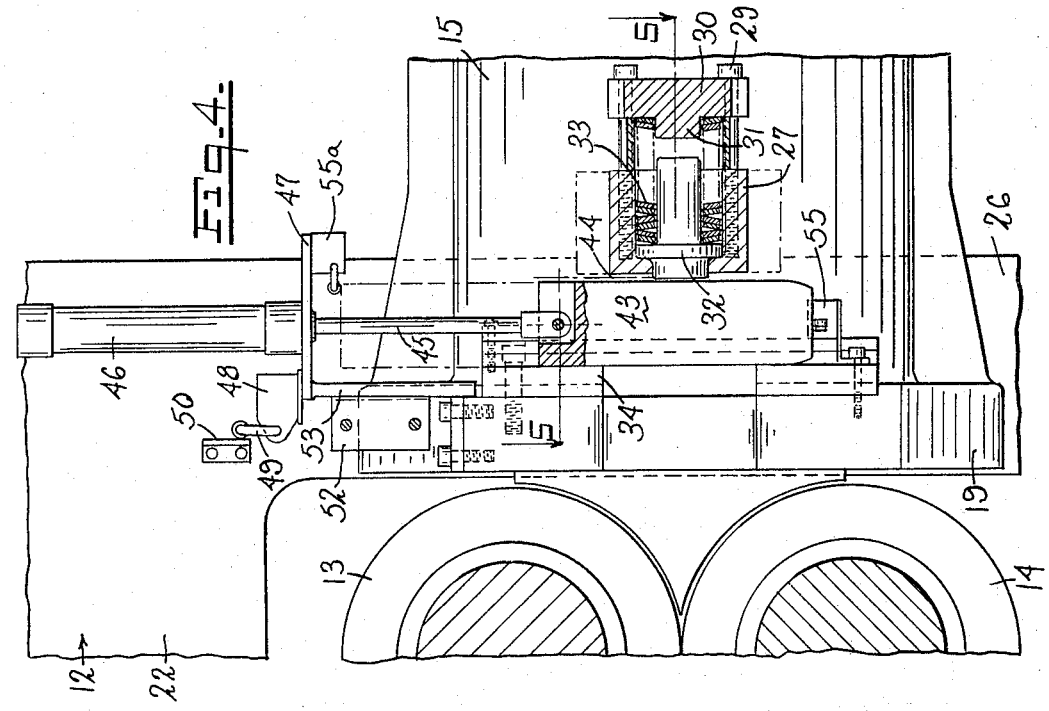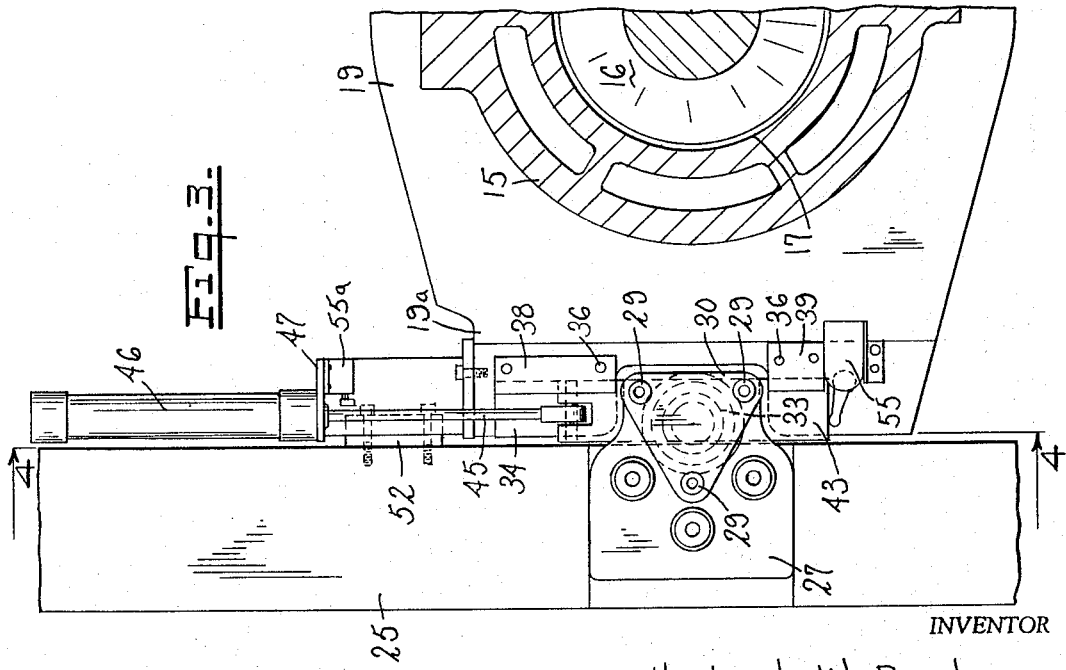

Dec. 26, 1967   H. W. BAINTON   3,359,597
EXTRUDER-ROLLER DIE
Filed July 26, 1966   3 Sheets-Sheet 3
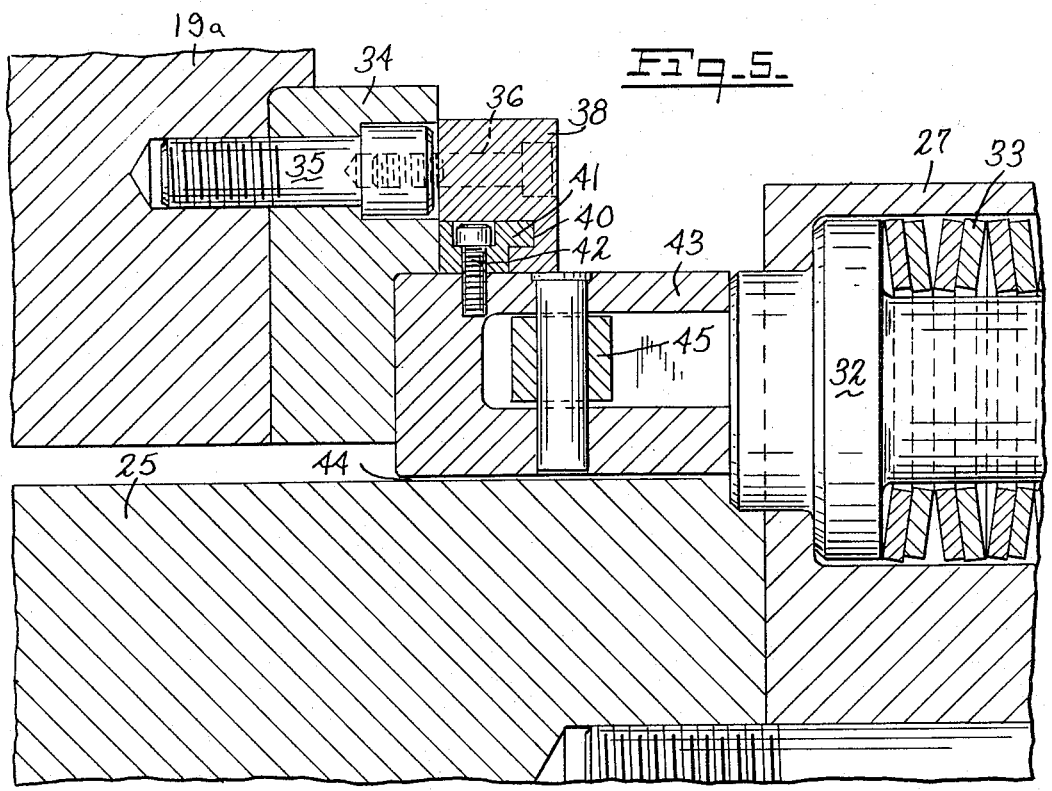
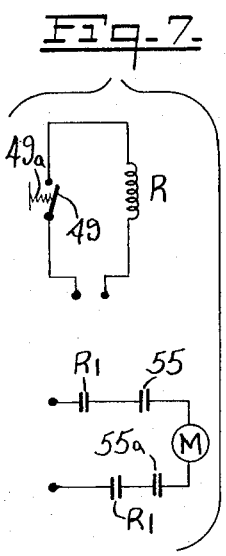
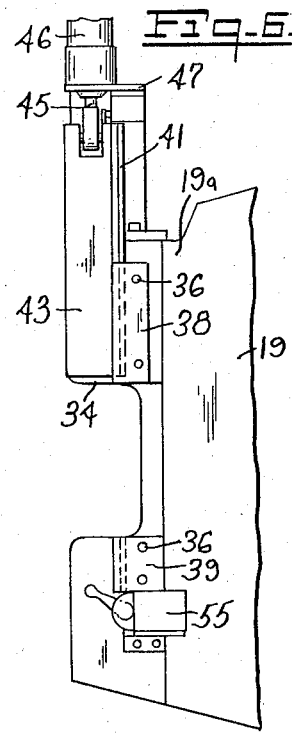
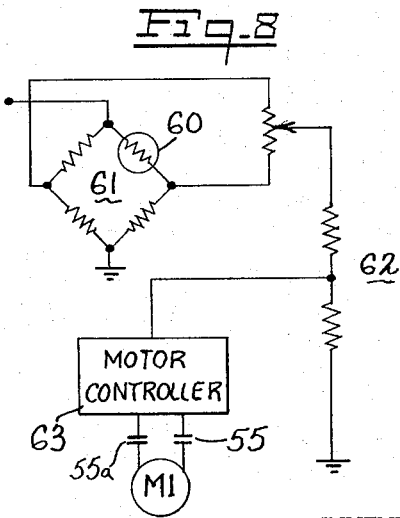
INVENTOR
Herbert W. Bainton
BY DeLio and Montgomery
ATTORNEYS

United States Patent Office 3,359,597
Patented Dec. 26, 1967

3,359,597
EXTRUDER-ROLLER DIE
Herbert W. Bainton, Woodbridge, Conn., assignor to
Farrel Corporation, Ansonia, Conn.
Filed July 26, 1966, Ser. No. 567,914
12 Claims. (Cl. 18—12)

This invention relates to extruder-calendering apparatus, and more particularly relates to an extruder-roller die for semi-fluid material such as plastics, rubber and the like.

An extruder-roller die may comprise an extruding device in which material is mixed and propelled along the length of a cylinder or barrel, through a discharge orifice, and introduced onto cooperating calender rolls which calender the material to the finished dimensions. The material after being deposited in a hopper is mixed or treated and then forced through the extruder barrel which spreads and discharges the material in a plastic state onto the calender rolls which calender the material into a web or sheet under heavy pressure. In this arrangement, the calender rolls define a die orifice and the material in plastic form is introduced onto the rolls which perform the actual shaping. The material as introduced to the rolls is in a generally undefined or bulk state.

An extruder-roller die of the type described is disclosed and claimed in the co-pending application of Donald C. Chase, Ser. No. 324,973, filed Nov. 20, 1963, now Patent No. 3,274,645 granted Sept. 27, 1966, which is assigned to the same assignee as this application. It has been found in practice that as the material is introduced to the calender rolls, excessively high pressures may be exerted on the calender rolls, which may occur at a time when the extruder is delivering to the rolls a volume of material in excess of what the calender rolls can deliver, or this same excessive pressure can occur due to unusually high viscosity of the material to be calendered. This could build up an accumulation of material which the rolls could not immediately handle, and require shut down of the apparatus and attendant removal and cleaning of the accumulated excess material before the equipment can be put back into productive use. It may readily be appreciated that this down time will cause an economic loss as well as a loss due to necessary maintenance time.

Accordingly, the present invention provides a new and improved arrangement for coupling an extruder to a roller die which senses an excess buildup or introduction of material in a plastic state to the roller die. The coupling is preferably resilient to allow relative movement of the extruder and the roller die to compensate for excessive pressure buildup between the two. The sensing means may be arranged to merely give a warning indication to operating and maintenance personnel, may be utilized to shut down the extruder-roller for a predetermined length of time, or may be utilized as a control signal to decrease the amount of material delivered through the extruder to the roller die until the pressure decreases to a predetermined value.

Accordingly, an object of this invention is to provide a new and improved extruder-roller die.

Another object of this invention is to provide new and improved means for sensing excessive pressure exerted on the roller die due to buildup or the accumulation of plastic material at the rollers.

Another object of this invention is to provide new and improved means for resiliently coupling an extruder in predetermined relationship to a roller die.

A further object of this invention is to provide new and improved means for regulating the amount of material in plastic form which is delivered to the orifice of an extruder-roller die so as to avoid any buildup of excessive material and, hence, pressure on the roller die.

The features of the invention which are believed to be novel are set forth with particularity and distinctly claimed in the concluding portion of this specification. The invention, however, both as to its organization and operation together with further objects and advantages thereof may best be appreciated by reference to the following detailed description taken in conjunction with the drawings, in which:

FIG. 1 is a side elevation of an extruder-roller die;
FIG. 2 is a view seen in the plane of lines 2—2 of FIG. 1;
FIG. 3 is a view seen in the plane of lines 3—3 of FIG. 2;
FIG. 4 is a view seen in the plane of lines 4—4 of FIG. 3;
FIG. 5 is a view seen in the plane of lines 5—5 of FIG. 4;
FIG. 6 is a view of a portion of the extruder head as shown in FIG. 3, but with the calender frame removed;
FIG. 7 is a schematic representation of a circuit for controlling delivery of material by the extruder; and
FIG. 8 is a schematic representation of a network for regulating the speed of a drive motor to regulate the pressure of material between the rolls and the extruder.

To illustrate an embodiment of the invention an extruder-roller die, generally indicated by the reference numeral 10, is illustrated in FIG. 1. The extruder-roller die 10 comprises an extruder portion 11 and a roller die in the form of a calender 12 having cooperating rolls 13 and 14, which define a die orifice therebetween. The extruder includes a barrel 15 having an extruder screw 16 in a longitudinal passage 17 defined therein. Screw 16 is driven through a suitable motor and gearing located in a housing 18, and material deposited in a hopper 15a is mixed in the extruder and then transferred along the length of passage 17 by screw 16. The material advanced by screw 16 is advanced into an extruder head 19 which is preferably the type shown in the aforementioned co-pending application. Extruder head 19 defines an orifice 20 which discharges material in a plastic state between the nip of rolls 13 and 14. Rolls 13 and 14 are rotatably supported in calender frame 22 by means of journal boxes 13a and 14a, and support means such as adjustable jacks 23.

Calender frame 22 is movable on rollers 24 toward and away from extruder 11. Such movement is desirable to permit cleaning of extruder head 19 if the materials being calendered are changed and, also, to allow slight movement between the calender and the extruder for reasons hereinafter set forth.

In operation, as extruder screw 16 is operated material is loaded into a hopper 15a. Such material is delivered in substantially bulk form to extruder head 19 and is discharged through orifice 20 to the nip between rolls 13 and 14 which form such plastic material into a sheet or web of specified thickness and width. In this particular extruder-roller die where the final forming of the material occurs at the roll nip, the rolls tend to exert some pulling force on the material as it comes from the orifice 20. If desired, the walls of the orifice may be so shaped and contoured as to impart directional components to the material as it leaves the extruder barrel so that it will more uniformly spread across the nip of rolls 13 and 14.

If the flow of material from the barrel 15 should be more than could be handled by the rolls at their then operating speed, there would be a tendency for the material to build up between orifice 20 and the nip, and create undue pressure. Similarly, such undue pressure could result of the material were of an unusually high viscosity.

In accordance with one aspect of the invention, during operation the calender 12 and extruder 11 are so connected that any excess pressure will be sensed and the means providing such pressure sensing may be utilized to furnish a signal which will provide corrective action.

Attached to each of upright columns 25 and 26 of frame 22 are heavy block members 27 and 28, respectively. Each of block members 27 and 28 receives a plurality of headed bolts 29 (FIGS. 4 and 5) which pass through a biasing reaction member 30 having a central lug or projection 31 thereon. For purposes of further disclosure, only member 27 will be primarily referred to, it being understood that the construction of member 28 is the same as member 27. Received within each of members 27 and 28 is a plunger-like member 32 which is urged outwardly or to the left, as viewed in FIG. 4, by resilient biasing means in the form of a plurality of alternately oppositely disposed dished washer-like members 33, commonly referred to as Belleville washers.

Flanges 19a extend from either side of extruder head 19. Wear or bearing plates 34 are secured to flanges 19a as by means of bolts 35. Attached to wear plates 34 by means of a plurality of bolts 36 are upper and lower gibs 38 and 39 defining keyway 40 which receives therein a key retainer 41. Key retainer 41 is attached by a multiplicity of bolts 42 to a heavy key 43 which is received in a channel 44 defined by wear plate 34, gibs 38, 39, column 25, and the plunger 32 within member 27. This key acts to lock extruder head 19, and thus the extruder, to frame 22 in predetermined relationship with rolls 13 and 14. Key 43 is vertically movable by means of the piston rod 45 (FIGS. 4 and 5) of a fluid actuated cylinder 46 which is carried on a generally L-shaped bracket 47 mounted to extruder head 19 through wear plate 34. Also carried on bracket 47 is a limit switch 48 having a switch arm 49 which contacts an actuating stop 50 on column 25. Arm 49 is shown in a closed position, and is biased toward an open position when not closed by stop 50.

Key 43 acts to lock the extruder head to the calender frame and, hence, position the extruder head a predetermined distance from the rolls 13 and 14. This arrangement provides an efficient means for rapidly connecting and disconnecting the two units.

This is accomplished by moving the calender up to the extruder head until a stop block 52 on the inner side of the columns 25 and 26 is engaged by a portion 53 of bracket 47 (FIG. 4). At this time, member 50 actuates arm 49 to close switch 48. Then cylinder 46 is actuated to lower key 43 in channel 44 between wear plate 34 and plunger 32 to lock the extruder to the calender frame. When key 43 is moved downward to the locking position it actuates a lower limit switch 55 (FIG. 3) to signal that the calender is locked to the extruder, and also allows an upper limit switch 55a to close.

In operation, if the pressure of the material delivered to the die orifice defined by the rolls should become excessive this pressure will tend to push the calender away from the extruder. Such movement is yieldingly opposed by plunger 32 and the resilient means so as to prevent any undue shock or strain on the equipment, yet allow such movement to compensate for the accumulation of plastic material. If the pressure becomes excessive and above a predetermined limit, it will result in sufficient movement so that stop 50 moves away from switch actuating arm 49 which is biased towards an off position. The opening of switch 48 may act in various ways to signify or apply corrective action due to the over pressure.

In response to sensing of excessive pressure, switch arm 49 may be opened by its biasing means 49a, as shown schematically in FIG. 7 to de-energize a relay R, which opens its contacts $R_1$ and thereby de-energizes motor M driving the extruder screw 16. This would temporarily decrease the plastic material being discharged from the orifice 20 to the roll nip as the excessive pressure subsides and plunger 32 urges the calender back towards the position shown in FIG. 4. When switch arm 49 is again closed by contact with stop 50, relay R is energized, picks up its contact $R_1$ and motor M again drives extruder screw 16 which advances material to the extruder head. This is essentially an on-off control.

FIG. 8 exemplifies another arrangement for controlling the speed of the extruder drive motor and/or the roll drive motor. A strain gage 60 may be connected so as to sense motion between the extruder head and the calender. The strain gage would be connected in a conventional strain gage bridge 61 and any unbalance in the bridge would provide a signal across a resistance network 62, which would be applied to a motor speed control network 63 which regulates the speed of a motor $M_1$ which drives either the rolls or the extruder screw. It is to be understood that the speed of either or both of the extruder screw or the rolls may be varied to compensate for an excessive buildup in pressure at the roller die. In this manner, the amount of material delivered to the rolls, as well as the amount of material delivered by the rolls, is regulated.

The connection of switches 55 and 55a in the motor control circuits of FIGS. 7 and 8 prevents operation of the apparatus until a locked condition between the extruder and the calender frame is sensed. Switch 55a closes only when the locking key is moved toward a locking position, and is opened when the key is not in a locking position. The controlled movement of the extruder with respect to the calender frame as by means of the resilient coupling further allows continuous regulation of the material delivered to the roll nip.

The present invention accordingly provides a new and improved resilient coupling and locking means for coupling an extruder to a roller die. Sensing means are further provided to sense excessive pressure existing between the extruder head and the roller die, and means are further provided to regulate the amount of material delivered to the calender rolls and/or the rate at which material is delivered from the calender rolls to overcome any tendency towards buildup of excessive pressure and, hence, undesired accumulation of material at the entrance to the roller die.

It may thus be seen that the objects of the invention set forth as well as those made apparent from the preceding description are efficiently attained. Other embodiments of the invention as well as modifications to the disclosed embodiment of the invention which do not depart from the spirit and scope of the invention may occur to those skilled in the art. Accordingly, the appended claims are intended to cover all embodiments and modifications to the disclosed embodiment of the invention which do not depart from the spirit and scope thereof.

What is claimed is:

1. In an extruder-roller die including an extruder adapted to supply material in a plastic state to a pair of rolls for calendering, the rolls being rotatably mounted in a movable frame; means resiliently connecting the extruder to the frame, and means for sensing movement of the frame relative to the extruder.

2. The invention of claim 1 further including means for indicating movement of the frame relative to the extruder above a predetermined distance.

3. The invention of claim 1 further including means responsive to said sensing means for controlling the rate of delivery of material to the rolls.

4. The invention of claim 2 further including means responsive to said sensing means for halting delivery of material to the rolls.

5. The invention of claim 1 further including means responsive to said sensing means for varying the speed of the rolls.

6. In an extruder-roller die including an extruder barrel having an extruder head mounted thereto adapted to supply material in a plastic state to a pair of rolls for calendering, the rolls being rotatably mounted in a movable frame having upright column members, force reacting members secured to said columns on the extruder side of the rolls and extending transversely of the extruder, said extruder head carrying on either side thereof key guiding means, each of said key guiding means having spaced apart sections to permit passage of said reacting members therethrough, said extruder head and said reacting members defining channels and locking keys carried on said extruder head arranged to be inserted into said channels to prevent withdrawal of said frame from said extruder head, said reacting members including resilient means bearing on said keys to yieldingly resist movement of said frame from said extruder head.

7. The apparatus of claim 6 further including means for sensing movement of the frame from the extruder head.

8. The apparatus of claim 7 further including means responsive to said sensing means for controlling the material delivered by the extruder to the rolls.

9. The apparatus of claim 7 further including drive means for said rolls, said drive means being responsive to said sensing means to vary the speed of said rolls.

10. In an extruder-roller die including an extruder barrel having an extruder head mounted thereto adapted to supply material in a plastic state to a pair of rolls for calendering, the rolls being rotatably mounted in a movable frame having upright column members, an extruder head arranged to fit between the column members, said extruder-head having extensions on either side thereof, said column members carrying channels defining members adapted to define channels with said extensions and said columns, and a keys carried by said extruder head adapted to be received in said channels.

11. The apparatus of claim 10 wherein said defining members further include resilient means acting upon said keys to yieldingly resist movement of the frame from said extruder.

12. An extruder-roller die including an extruder, a pair of cooperating rolls, said extruder having a barrel adapted to supply material in a plastic state to said rolls for calendering, a frame rotatably mounting said rolls, said extruder and said frame being arranged to permit relative movement therebetween if an excess of material is delivered to said rolls by said extruder, an extruder head mounted to said barrel and arranged to be coupled to said frame in position to supply material in a plastic state from said barrel to said rolls, and coupling means including resilient means connecting said extruder to said frame to yieldingly permit limited movement of said frame relative to said extruder.

References Cited
UNITED STATES PATENTS 3,274,645    9/1966    Chase _____ 18—12

WILLIAM J. STEPHENSON, *Primary Examiner.*